United States Patent
Chen et al.

(10) Patent No.: US 6,361,056 B1
(45) Date of Patent: Mar. 26, 2002

(54) POSITIONING DEVICE FOR A BACKREST OF A STROLLER

(75) Inventors: Er-Jui Chen, Feng-Shan; Hung-Chung Hou, Tai-Pao, both of (TW)

(73) Assignee: Link Treasure Limited, Tortois, VI (US)

( * ) Notice: Subject to any disclaimer, the term of this patent is extended or adjusted under 35 U.S.C. 154(b) by 0 days.

(21) Appl. No.: 09/396,497

(22) Filed: Sep. 13, 1999

(51) Int. Cl.7 .................................................. B62B 7/06
(52) U.S. Cl. .................. 280/47.4; 280/47.38; 280/642; 280/647
(58) Field of Search ........................... 280/47.4, 47.371, 280/47.34, 657, 658, 650, 647, 642, 47.38; D12/129; 160/59, 65, 81; 248/506, 125.3, 354.6; 292/341.15

(56) References Cited

U.S. PATENT DOCUMENTS

| | | | | | |
|---|---|---|---|---|---|
| 4,741,551 A | * | 5/1988 | Perego | ....................... | 280/642 |
| 4,805,928 A | * | 2/1989 | Nakao | ....................... | 280/642 |
| 5,257,799 A | * | 11/1993 | Cone | ....................... | 280/642 |
| 5,447,323 A | * | 9/1995 | Huang | ....................... | 280/642 |
| 5,478,102 A | * | 12/1995 | Huang | ....................... | 280/642 |
| 5,482,311 A | * | 1/1996 | Huang | ....................... | 280/642 |
| 5,546,256 A | * | 8/1996 | D'Antuono | ................ | 297/377 |
| 5,725,238 A | * | 3/1998 | Huang | ....................... | 280/642 |
| 5,749,627 A | * | 5/1998 | Perego | ....................... | 297/370 |
| 5,806,877 A | * | 9/1998 | Huang | ....................... | 280/642 |
| D422,538 S | * | 4/2000 | Chen et al. | ................ | D12/129 |
| D431,213 S | * | 9/2000 | Yang | ....................... | D12/129 |
| 6,135,487 A | * | 10/2000 | Flannery et al. | ............ | 280/642 |
| 6,189,914 B1 | * | 2/2001 | Worth et al. | ................ | 280/642 |

* cited by examiner

*Primary Examiner*—J. J. Swann
*Assistant Examiner*—David Divine
(74) *Attorney, Agent, or Firm*—W. Wayne Liauh

(57) ABSTRACT

The present invention relates to a positioning device for a backrest of a stroller, which can fix the backrest frame of the stroller on different positions to meet variety-resting needs. Especially, when the backrest frame is on a position undertaking larger loading, it secures the backrest from taking off or dropping down. The positioning device for a backrest of a stroller comprises a positioning seat mounted on a rear frame of the stroller and a wedging hook mounted on the backrest for engaging with the positioning seat. A safe shield is equipped on the positioning seat for securely maintaining the position between the wedging hook and the positioning seat to make the backrest firmly keep fixed position when an accidentally torsion force occurs.

5 Claims, 7 Drawing Sheets

POSITIONING DEVICE FOR A BACKREST OF A STROLLER

BACKGROUND OF INVENTION

1. Field of Invention

The present invention relates generally to a positioning device for use in a backrest of a stroller which is adjustable in the angle of elevation and, more particularly, is well designed for undertaking additional torsion imposed on it and maintaining the predetermined position.

2. Related Art

A stroller is normally composed of a front frame, a rear frame, a handrail frame, a seat frame and a backrest. The conventional frames of a stroller are structured to have a foldable mechanism for convenience of carrying out and for the reduction of occupied space. Wheels are connected to the front and rear frames for easy moving. Soft pads are put on the seat frame and the backrest for more comfortable seating. The backrest of the stroller is generally one of two types, fixed or adjustable. The backrest in the fixed type is fixed on the seat frame and has only one declining angle after being assembled, while the adjustable type is pivoted on the seat frame and is adjustable in the declining angle. The angle between the seat frame and the backrest can be 180 degrees, that is, the backrest is in the same smooth plane with the seat frame for the baby to lie down, or 100 or 120 degrees for different lying posture. The point is that the adjustable backrest is always fixed to support the baby when it is moved to the desired position.

As taught in the U.S. Pat. No. 5,482,311, which disclosed a backrest adjusting device for a stroller which includes a slidable seat slidably mounted to each of the two limbs of a backrest frame member of the stroller. Each slidable seat includes a receptacle, a spring mounted in the receptacle, a first pin mounted above the spring and transversely passing through an associated limb of the backrest frame member, a stop piece mounted in the receptacle and located above the first pin thereby defining a lowermost position of the slidable seat, and s second pin projecting outward from an outer periphery thereof. A pull bar is mounted between the slidable seats. The second pin engage with sockets defined in a frame of the stroller when the backrest frame member is in a substantially upright position. The backrest frame member is pivotable to a substantially horizontal position when the second pin disengage from the socket upon actuation of the pull bar which causes upward movement of the slidable seats.

U.S. Pat. No. 5,447,323 disclosed another positioning device of backrest of a stroller which comprises a positioning plate securely mounted to each of two limbs of the backrest frame member of the stroller and has a pushing piece extending toward a front direction of the stroller and a flexible operative piece having a recess therein which faces the front direction of the stroller. The stroller has a pair of mounting seats for mounting the canopy frame member and the rear members thereof to the handle thereof. Each mounting seat has a peg thereon for releasably engaging with the recess of the associated flexible operative piece.

All the above-mentioned patents belong to the kind of positioning devices for a backrest of a stroller which have to do with the loading of a child imposed thereon when sitting on the stroller. They employ hooking devices which engage with the accompanying pegs downward or upward to complete the positioning action.

However, whatever positioning devices are used, they must be capable of firmly holding the position set and secure the child sitting thereon. In the case of aforesaid unsteadily vibration, the child makes not only a downward gravity force but also a lateral or tortional force. This will cause the positioning device to move from its predetermined position and cause the backrest to suddenly fall down, which can, in turn, injure the child.

The foregoing has outlined some of the more pertinent objects of the present invention. These objects should be construed to be merely illustrative of some of the more prominent features and applications of the intended invention. Many other beneficial results could be obtained by applying the disclosed invention in a different manner or modifying the invention within the scope of the disclosure. Accordingly, other objects and a fuller understanding of the invention may be had by referring to the summary of the invention and detailed description of the preferred embodiment in addition to the scope of the invention as defined by the claims taken in conjunction with the accompanying drawings.

SUMMARY OF THE INVENTION

Accordingly, the present invention provides mainly a positioning device for use in a backrest of a stroller which securely maintains the intended position.

In order to meet the object of the present invention, which comprises: a positioning seat mounted on the rear frame and a wedging hook mounted on the backrest for engaging with the positioning seat. A safe end is equipped on the positioning seat for securely maintaining the position between the wedging hook and the positioning seat to make the backrest firmly keep its position when an accidentally torsion force occurs.

These and other features of the present invention will become more fully apparent from the following description and dependent claims taken in conjunction with the accompanying drawings.

BRIEF DESCRIPTION OF THE DRAWINGS

The present invention is illustrated by the following drawings in which.

DETAILED DESCRIPTION OF THE PREFERRED EMBODIMENT

Figure 1:
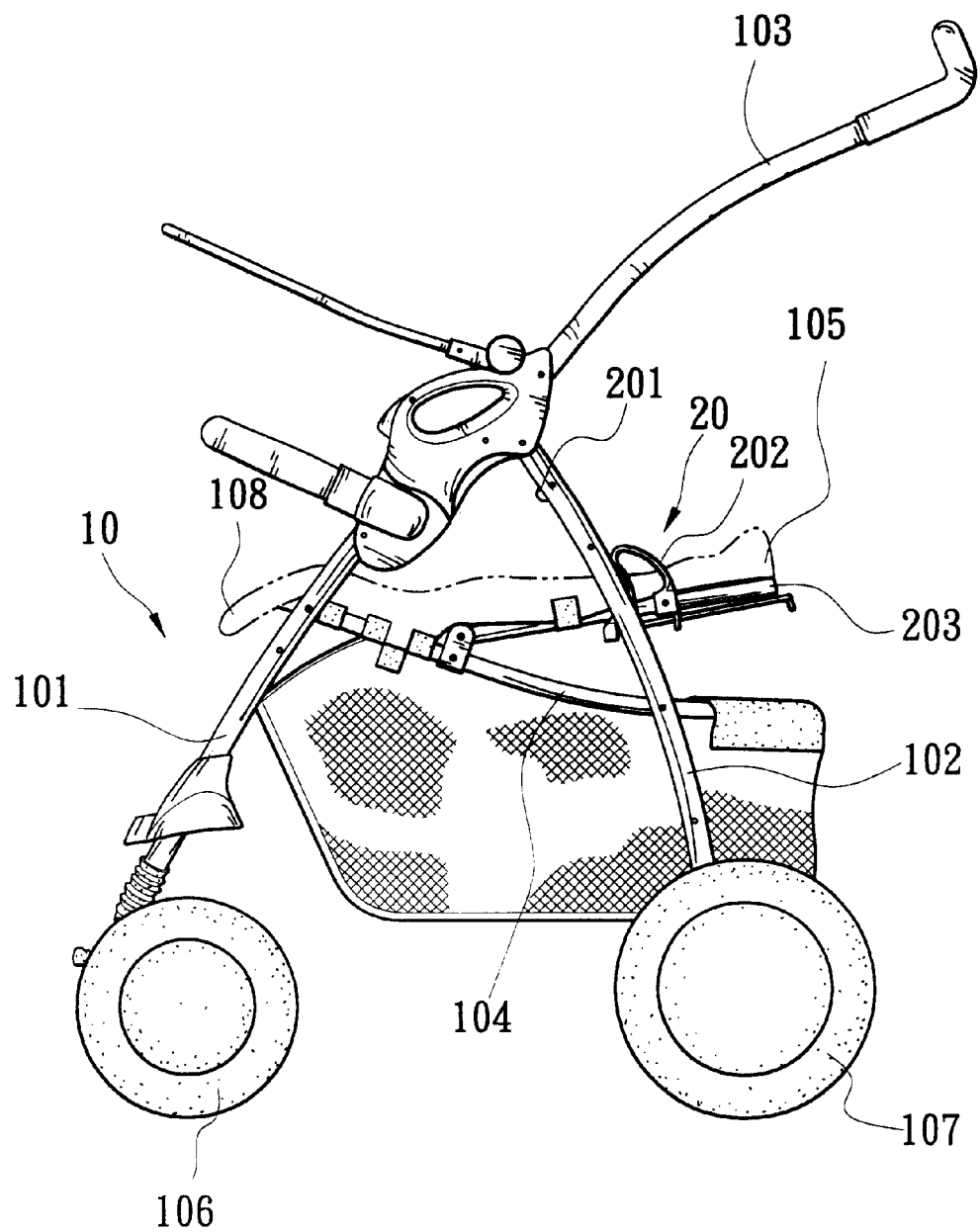
FIG. 1 is a perspective view of the embodiment of the present invention.

The first embodiment of the present invention provides a positioning device for a backrest of a stroller. Referring to FIG. 1, the stroller 10 is mainly composed of a front frame 101, a rear frame 102, a handrail frame 103, a seat frame 104 and a backrest frame 105. Wheels 106 and 107 are connected to the front and rear frames 101 and 102 for moving easier. Soft pads 108 are placed on the seat frame 104 and the backrest frame 105 for more comfortable seating. The present invention aims at the improving the positioning function of the backrest frame 105, so that the backrest frame 105 must be connected to an adequate place of the seat frame 104 by a movable junction in order to easily change the inclination angle thereof.

Figure 2:
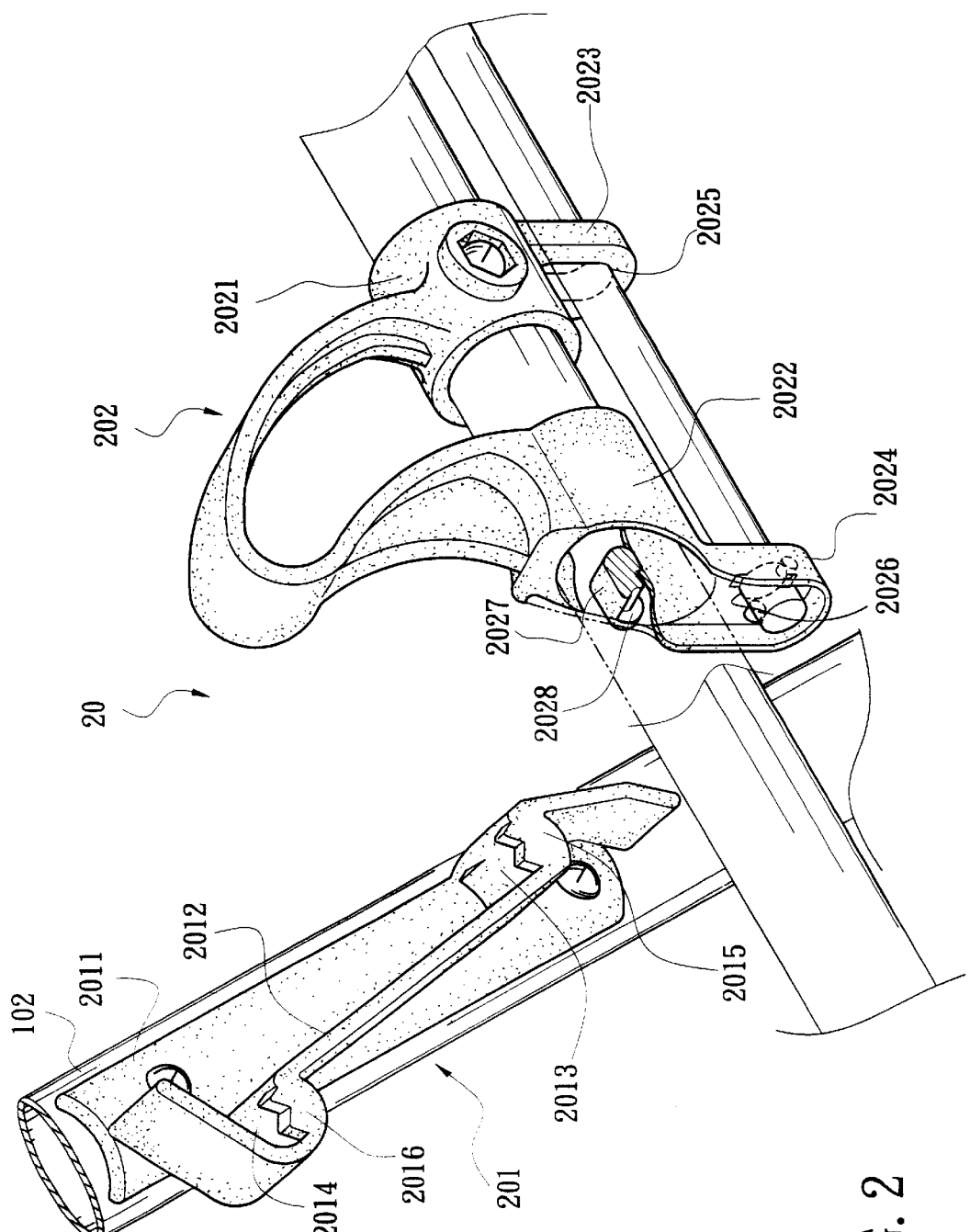
FIG. 2 is a perspective view of the detailed structure of the present invention.

Referring to the FIG. 2, the positioning device 20 of the embodiment of the present invention is composed of a pair of positioning seats 201, a pair of wedging hooks 202 and a pull bar 203.

The positioning seat 201 is in an adequate place of the rear frame 102. The positioning seat 201 comprises a mounting portion 2011 which is arc-shaped in its surface plane and firmly mounted on the limb of the rear frame 102, a slide rim 2012 which is extended from the side face of the mounting portion 2011 and inclines a little and positioning recesses 2013 and 2014 which are located on both ends of the slide rim 2012 with their open faces upward.

The wedging hook 202 is mounted on an adequate place of the backrest frame 105 where the positioning seat 201 matches the wedging hook 202 when the backrest frame is in its moving interval. The wedging hook 201 is about the shape of 'v', and a first holding tube 2021 and a second holding tube 2022 are connected to both ends thereof The first holding tube 2021 and the second holding tube 2022 are open on both ends for being fitted through by the limb of the backrest frame 105. The first holding tube 2021 is fixed on the backrest frame 105 while the second holding tube 2022 is not fixed. Therefore, the second holding tube 2022 connected to one end of the 'v' shaped wedging hook 202 can move a little toward the first holding tube 2021 by applying an external force. A first extend portion 2023 and a second extend portion 2024 are extended outward from the first holding tube 2021 and the second holding tube 2022, respectively. A first perforation 2025 and a second perforation 2026 are located on the first holding tube 2021 and the second holding tube 2022, respectively. A positioning piece 2027 extends outward from side face of the second holding tube 2220 and is located on the place where the positioning piece 2027 properly matches the slide rim 2012 of the positioning seat 201. Moreover, the positioning piece 2027 could have a wedging recess 2028.

The pull bar 203 has the shape of 'U', which passes through the first and second perforations 2025 and 2026 and has its one end fixed on the second perforation 2026. When the pull bar 203 is pulled, the second holding tube 2022 slightly moves toward the first holding tube 2021.

Figure 3A:
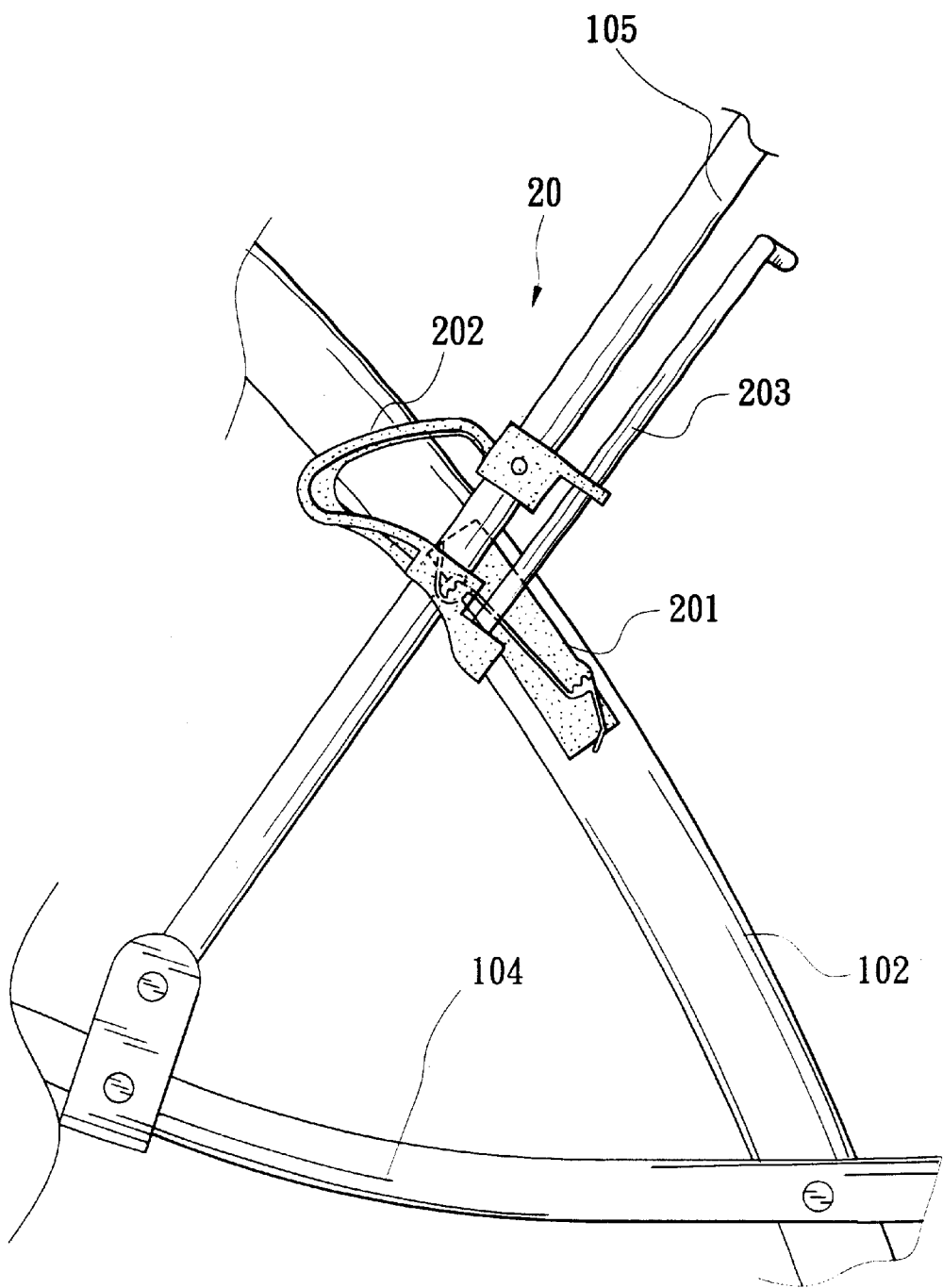
FIG. 3A is an enlarged perspective view of the present invention, depicting the positioning status of the positioning device.
Figure 3B:
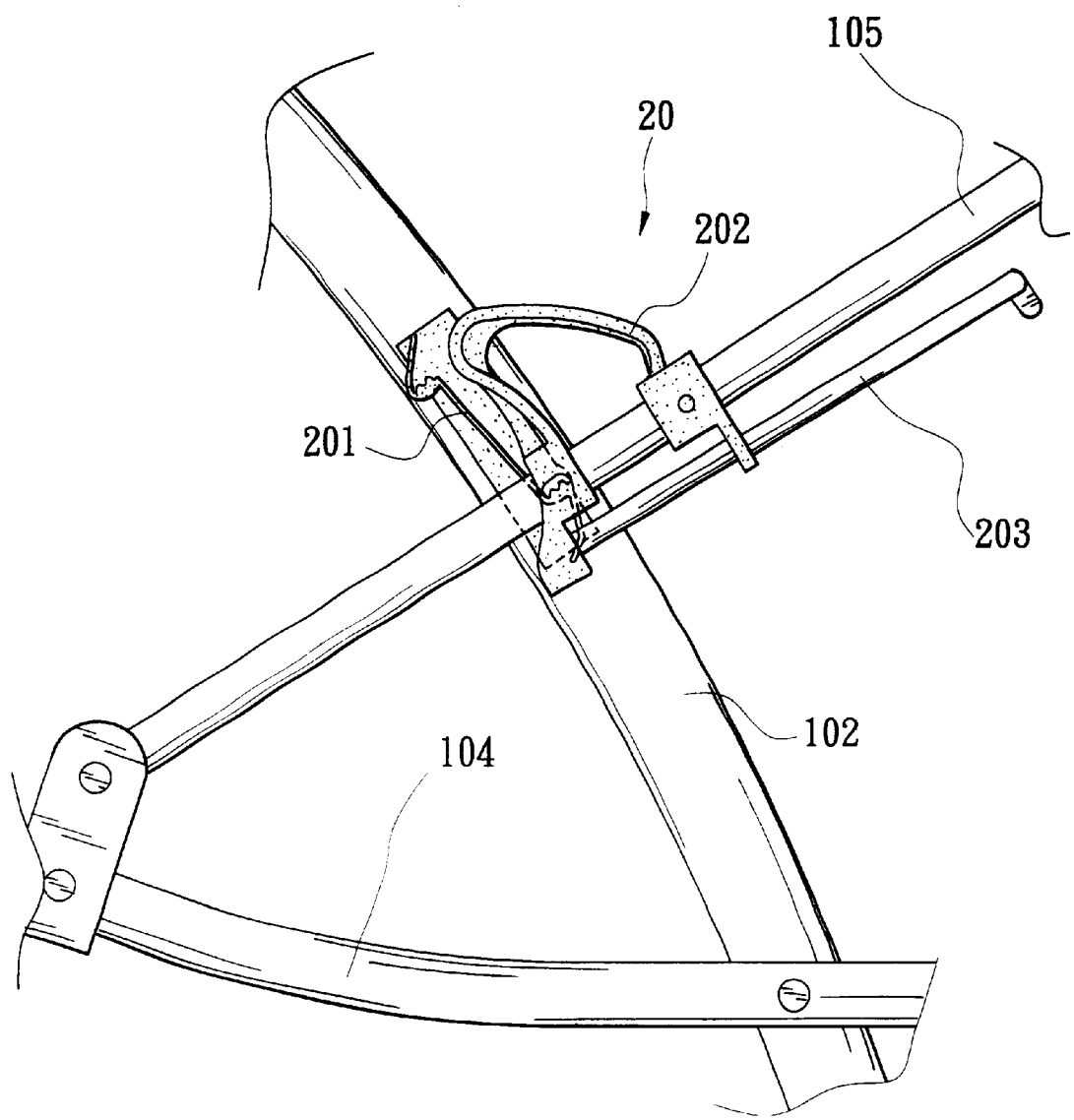
FIG. 3B is an enlarged perspective view of the present invention, depicting another positioning status of the positioning device.
Figure 3C:
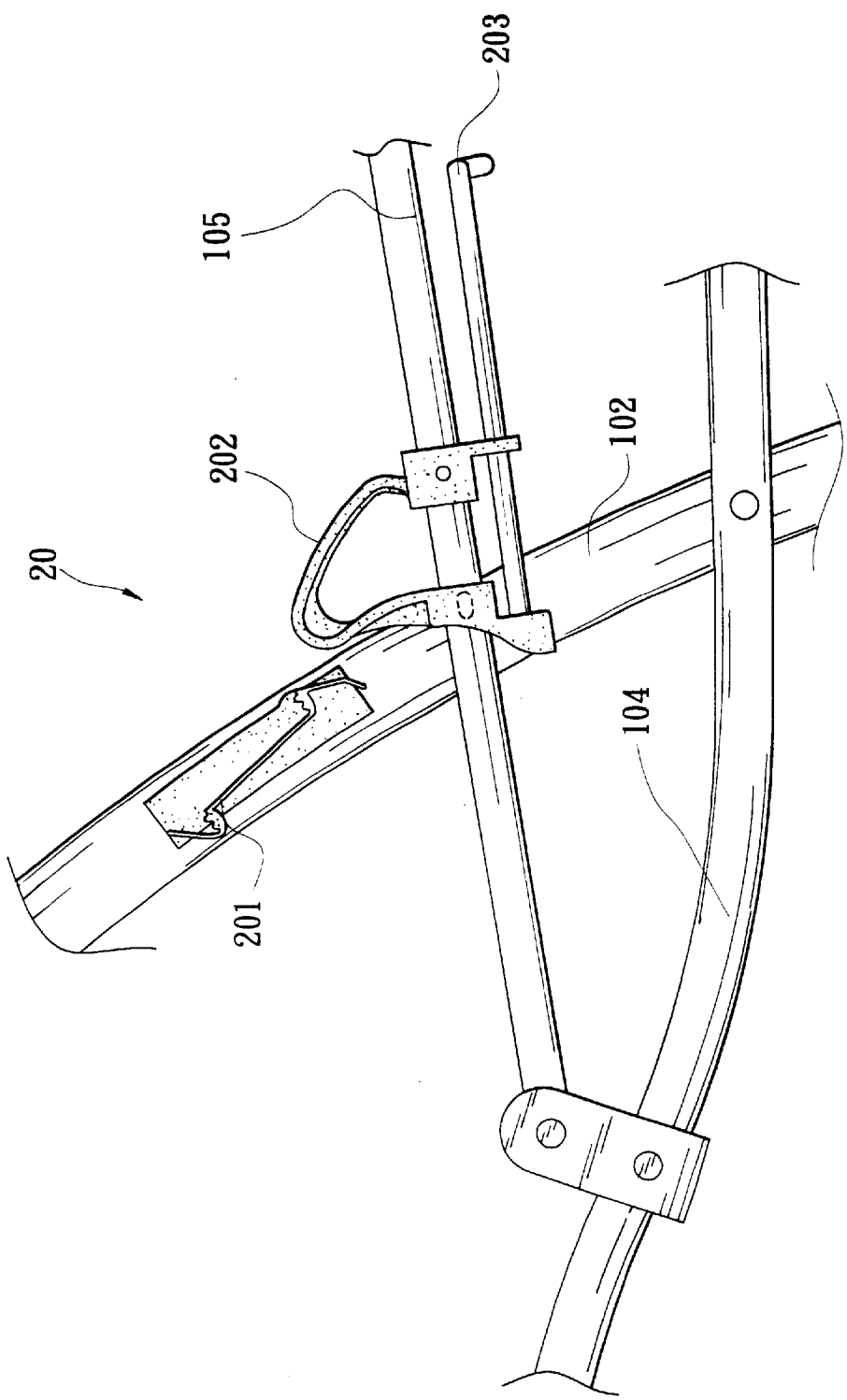
FIG. 3C is an enlarged perspective view of the present invention, depicting the other positioning status of the positioning device.

Referring to FIGS. 3A, 3B and 3C, the backrest frame 105 of the stroller 10 can pivot on the joint 1041 intersecting of the backrest frame 105 and the seat frame 104 in a variety of declining angle. In FIG. 3A, for example, the declining angle between the backrest frame 105 and the seat frame 104 is about 180 degree, that is, the backrest frame 105 is lying down horizontally, which is named the backrest frame 105 is inclining to the extent of resting, which is named the second position. Referring to FIG. 3C, the declining angle between the backrest frame 105 and the seat frame 104 is about 100 degree, that is, the backrest frame 105 is inclining to another resting position, which is named the third position. When the backrest frame 105 is on the first position, the position can be kept by applying a link bar or a wire cable, not figured out. Accordingly, the second and the third positions of the backrest frame 105 are kept by the positioning device 20, wherein the second holding tube 2022 of the wedging hook 202 right matches the positioning seat 201 when the backrest frame 105 is in a moving interval and the positioning piece 2027 of the second holding tube 2022 moves along the slide rim 2012 of the positioning seat 201.

Figure 4:
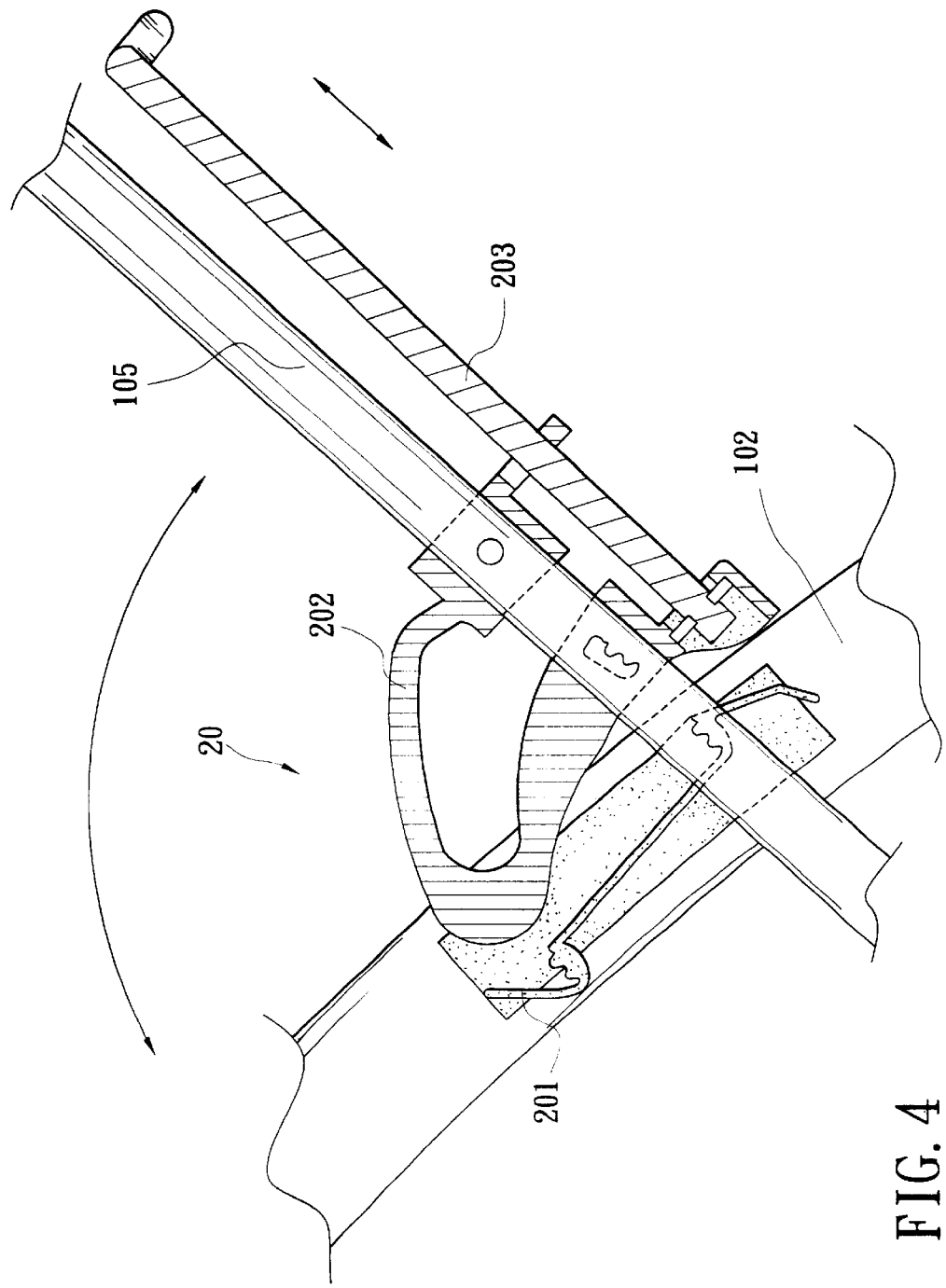
FIG. 4 is a sectional view of the present invention, depicting the actuation status of the positioning device.

When moving in the interval of angle from 100 to 120 degree between the backrest frame 105 and the seat frame 104, the positioning piece 2027 of the wedging hook 202 moves along the slide rim 2012 of the positioning seat 201 until the backrest frame 105 goes to the second position. The loading force, then, pushes the positioning piece 2027 of the wedging hook 202 to the positioning recess 2013 of the positioning seat 201. This causes the backrest frame 105 to be kept on the second position. In FIG. 4, when moving the backrest frame 105 to the third position, the pull bar 203 is pulled upward to make the second holding tube 2022 slightly moving toward the first holding tube 2021. At this moment, the positioning piece 2027 of the wedging hook 202 disengages from the positioning recess 2013 of the positioning seat 201 and still moves along the slide rim 2012 until falling into the positioning recess 2014. The backrest frame 105 then kept on the third position. Accordingly, if the backrest frame 105 is to be moved from the third position, we can also pull the pull bar 203 upward to disengage the positioning piece 2027 of the wedging hook 202 from the positioning recess 2014 of the positioning seat 201.

Figure 3D:
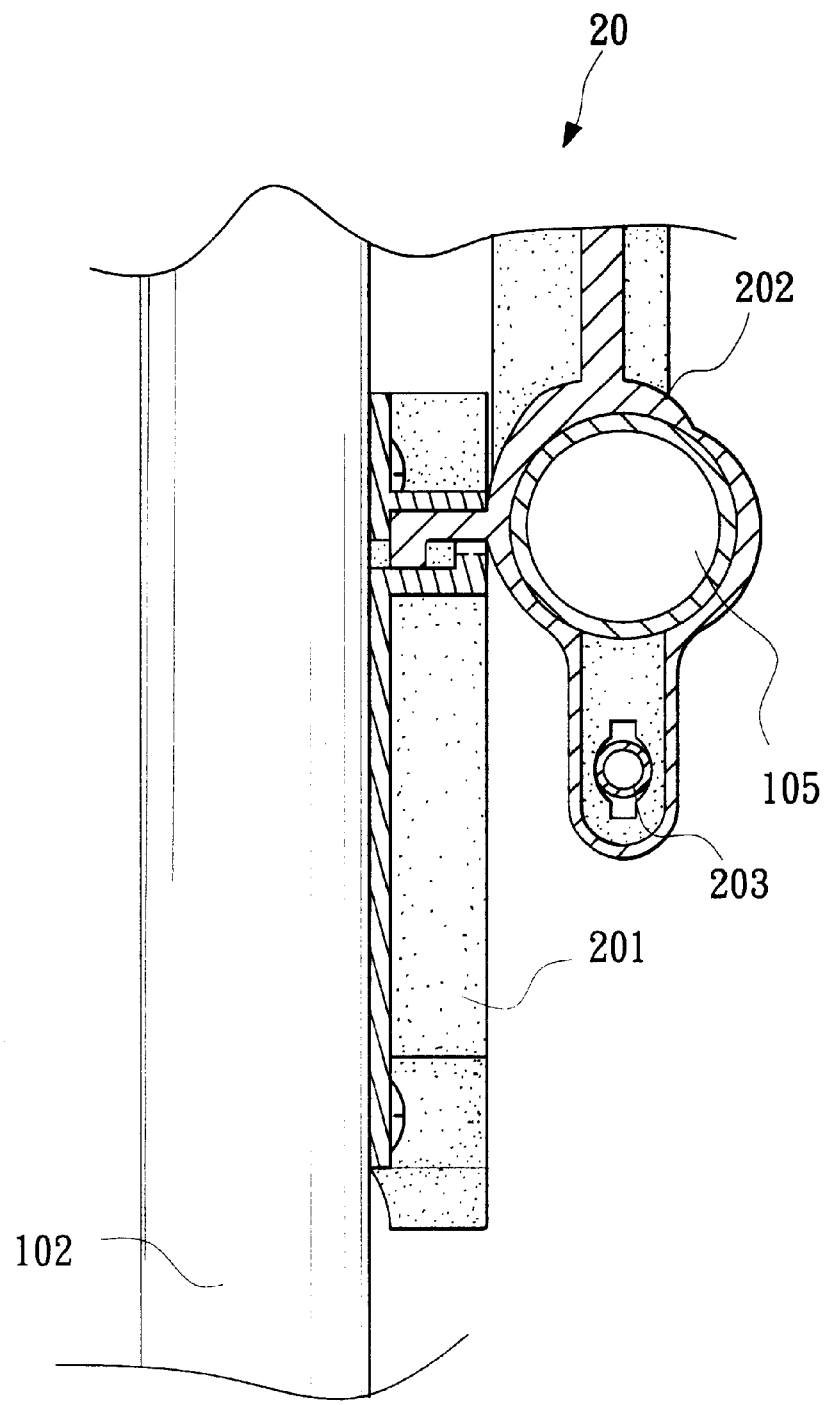
FIG. 3D is a sectional view of the present invention, depicting the positioning status of the positioning device.

The loading force, gravity, pulls the positioning piece 2027 downward to fall into the positioning recesses 2013 and 2014 vertically and keeps the positioning piece 2027 inside the positioning recesses 2013 and 2014. Furthermore, there are safe shields 2015 and 2016 extending from side faces of the positioning recesses 2013 and 2014 separately. They secure the positioning piece 2027 against escaping from the positioning recesses 2013 and 2014 when the stroller 10 is imposed on a lateral force or torsion. The wedging recess 2028 of the positioning piece 2027 does a further effect of hooking on to safe shield 2015 or 2016, as in FIG. 3D. This makes the using of the stroller 10 safer.

As to the manner of usage and operation of the present invention, the same should be apparent from the above description. Accordingly, no further discussion relating the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described, and accordingly, all suitable modifications and equivalents may be restored to, falling within the scope of the invention.

EFFECTS OF THE INVENTION

According to the embodiments of the present invention, the positioning device for a backrest of a stroller. it not only fixes the declining angle of the backrest frame by the positioning device but also resists the lateral force or torsion imposed on the stroller through the safe shields of the positioning recesses. Consequently, it firmly positions the backrest frame in a desired position and secures the child taking the stroller against danger.

Numerous variations and modifications will suggest themselves to persons skilled in the arts, other than those already described, without departing the basic inventive concepts. Although the present invention has been described with respect to typical preferred embodiments thereof, it should be understood that the present inventions is not limited to these embodiments, and various changes or modifications may be made without departing from the scope of the present invention as defined by the appended claims.

What is claimed is:

1. A positioning device for a backrest of a stroller, which can alternatively fix the backrest in one of a plurality of positions, comprising:

a pair of positioning seats, each of which is mounted at a fixed location of said stroller and has at least one positioning recess, and a pair of wedging hooks, each of which is mounted at a fixed location, corresponding to one of said positioning seats of said backrest, and capable of engaging and disengaging from said positioning recess of said positioning seat, a positioning piece connected to each said wedging hook to retain said wedging hook in said positioning seat, and a safety shield vertically extending from a side face of each of said positioning recesses, wherein said safety shield is constructed in such a manner so as to prevent said positioning seat from slipping from said side face of said positioning recess;

a pull bar for controlling the engagement status of said positioning recess with respect to said wedging hook;

wherein said wedging hook has a first holding tube and a second holding tube at both ends thereof for passing through said backrest, wherein said first holding tube is fixed on said backrest and said holding tube is slidably connected to said backrest;

said first holding tube and said second holding tube have a first protrusion and a second protrusion, respectively, which are respectively extended outward from said first holding tube and said second holding tube and have a first perforation and a second perforation located on the first holding tube and the second holding tube, respectively; and said pull bar is "L"-shaped, which passes through said first and said second perforations and has its one end fixed on said second perforation for slightly moving said second holding tube toward said first holding tube when said pull bar is pulled.

2. A positioning device for a backrest of a stroller, as described in claim 1, wherein said positioning seat has a mounting portion, wherein the surface of the mounting portion contacting the rear frame has an arc shape.

3. A positioning device for a backrest of a stroller, as described in claim 2, wherein said positioning seat has a side rim extending from a side face of said mounting portion and connecting between said positioning recesses at both ends thereof.

4. A positioning device for a backrest of a stroller, as described in claim 2, wherein said wedging hook has the shape of the Greek letter 'v'.

5. A positioning device for a backrest of a stroller, as described in claim 1, wherein said second holding tube has a positioning piece which is restricted within said positioning recess while moving.

* * * * *